June 13, 1939.  J. M. OLDHAM  2,162,563
MOLDING MACHINE
Filed Feb. 1, 1936  3 Sheets-Sheet 3
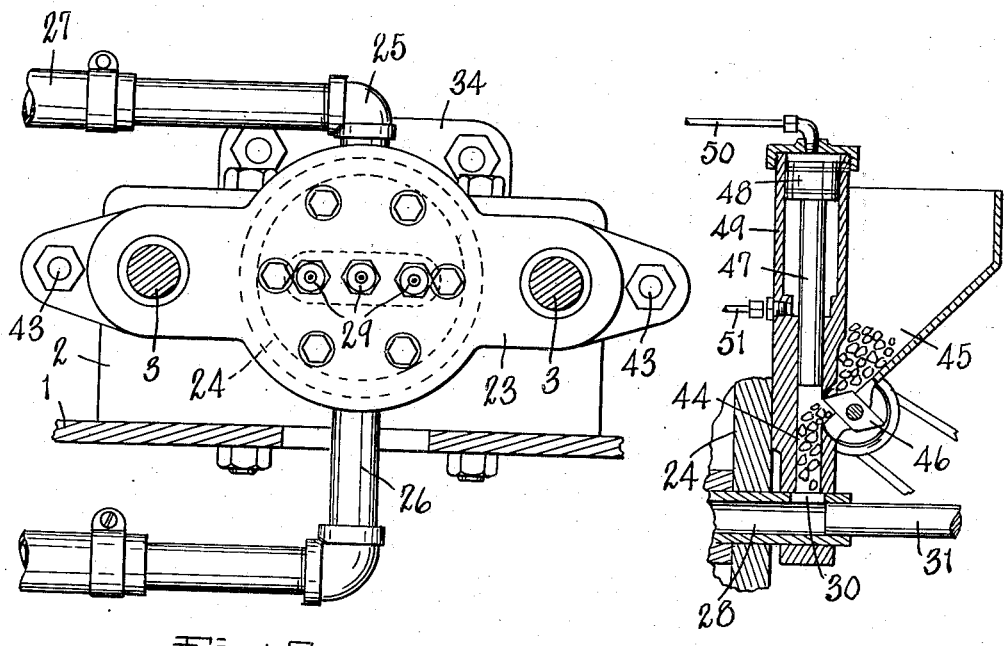
INVENTOR
JOHN M. OLDHAM
BY
ATTORNEYS Patented June 13, 1939

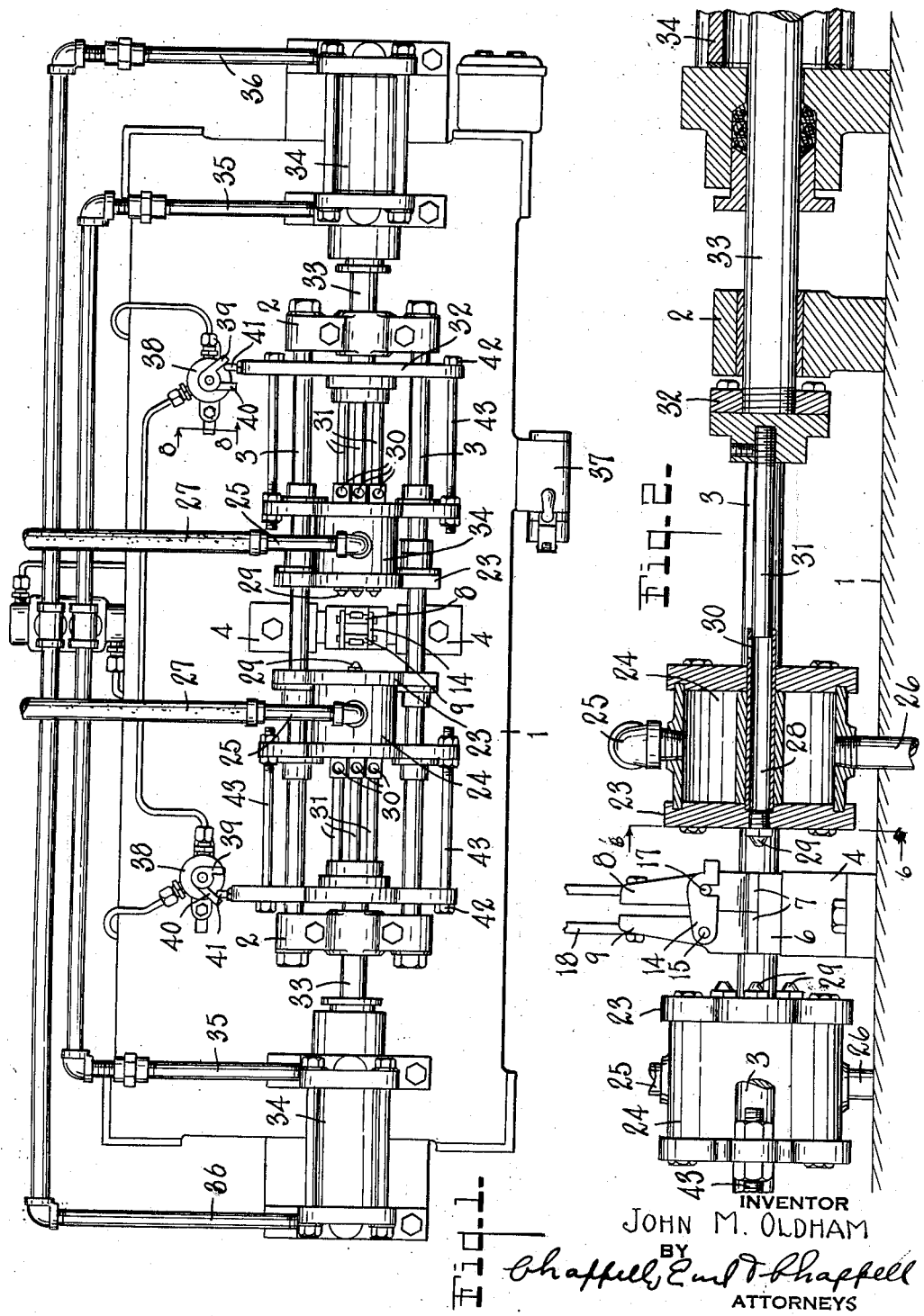

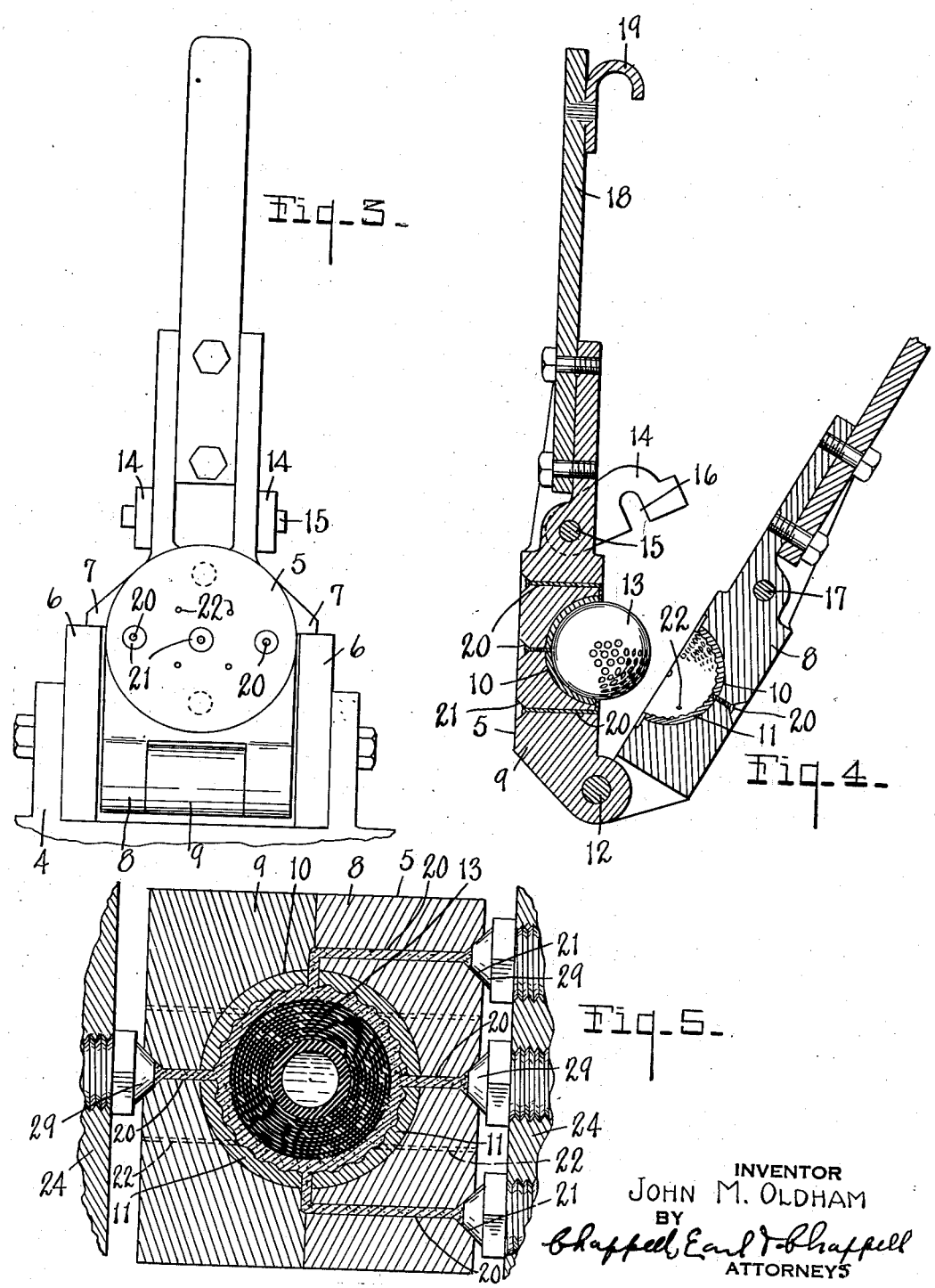

2,162,563

UNITED STATES PATENT OFFICE 2,162,563

MOLDING MACHINE

John M. Oldham, Detroit, Mich., assignor to Leonard A. Young, Detroit, Mich.

Application February 1, 1936, Serial No. 61,967

1 Claim. (Cl. 18—30)

This invention relates to improvements in molding machines.

The main objects of this invention are:

First, to provide a molding machine which is well adapted for the covering of golf balls with a shell or coating of plastic composition molded thereon.

Second, to provide a molding apparatus in which a shell of uniform thickness may be molded upon a golf ball body formed of plastic material as distinguished from preformed shell sections.

Third, to provide a molding machine which is of large capacity and adapted to mold covers or shells upon spherical objects such as golf balls with a great uniformity in results.

Fourth, to provide a molding apparatus which is of large capacity and at the same time comparatively simple in structure and easy to operate.

Objects relating to details and economies of the invention will appear from the description to follow. The invention is defined and pointed out in the claim.

A structure which is a preferred embodiment of the invention is illustrated in the accompanying drawings, in which:

Fig. 1 is a plan view of a molding apparatus embodying the features of my invention, certain of the fluid connections being broken away or omitted and others being shown in conventional form.

Fig. 2 is a fragmentary view partially in vertical longitudinal section.

Fig. 3 is a fragmentary side elevation of the mold and its support.

Fig. 4 is a detail vertical section of the mold in partially open position, a ball or piece of work being shown in one of the mold cavities.

Fig. 5 is an enlarged fragmentary view with the carriage in advanced or molding position relative to the mold, a golf ball with the cover molded thereon being shown within the mold.

Fig. 6 is an enlarged fragmentary view in section on line 6—6 of Fig. 2.

Fig. 7 is an enlarged fragmentary view mainly in section of a mechanical cylinder charging means.

Fig. 8 is a fragmentary view on line 8—8 of Fig. 1 showing details of the valve operating means.

In the embodiment of my invention illustrated, the table or bed 1 is of suitable dimensions to support the operating mechanism. On this table in spaced relation I mount a pair of pedestals 2 carrying the slide rods or rod-like way members 3. These are disposed in parallel relation.

Centrally between the pedestals I mount a bracket or support 4 for the mold designated generally by the numeral 5, this support having a pair of uprights 6 receiving the mold between them and the mold having rests 7 projecting at each side adapted to rest on the uprights 6 for removably supporting the mold.

The mold comprises a pair of sections 8 and 9 having complementary hemi-spherical mold cavities 10, these cavities being preferably provided with linings 11 suitably surfaced to provide the desired markings on the cover of the ball. The mold sections are pivotally connected at 12 so that they may be closed to mold forming position or opened as shown in Fig. 4 for the removal of the work, a golf ball 13 being shown. The sections separate along a vertical plane and are held in their closed position by means of the latches 14 pivoted at 15 and notched at 16 to engage pins 17 on the other section. One of the handles 18 is provided with a hook 19 for suspending the mold.

Each mold section is provided with a plurality of sprue passages 20 which open to the mold in diametrically opposed pairs and in uniformly spaced angular relation, such an arrangement, broadly considered, being illustrated and claimed in my application for Letters Patent, Serial No. 720,721, filed April 16, 1934.

These sprue passages, of which there are preferably three in each section, are so arranged as to terminate in the outwardly facing conical seats or recesses 21 in the outer sides of the mold, the seats of one section being preferably arranged in horizontal alignment and those of the other section in vertical alignment as is illustrated.

The mold is also preferably provided with vent openings 22 disposed in uniformly spaced angular relation to the openings of the sprue passages into the mold. In practice, I preferably provide a number of the molds for each molding machine, a single mold in the machine, however, constituting a functioning apparatus. However, in practice, a plurality of molds are provided so that they can be heated as by immersing in hot water prior to the molding operation and this prevents undue chilling of the plastic material as it is injected into the mold.

After removing from the machine, the molds can be submerged in cold water to cool or chill the mold thereby facilitating cooling and removal of the work. The molding material is simultaneously injected through the sprue passages with the result that it is unnecessary to provide centering means for the body of the ball to which the covering is to be applied, the injection of the plastic acting to effectively center the work as is described in my said application for Letters Patent. The molds being removably supported as has been described may be quickly positioned in molding position or removed.

The plastic injecting means comprises a pair of carriages 23 slidably mounted on the slide rods 3 for horizontal reciprocatory movement to and from each other. Each carriage is provided with a heating chamber 24 adapted to receive suitable heating fluid as hot water or hot oil, these chambers being provided with supply conduits 25 and discharge conduits 26. These conduits have flexible connections which permit the reciprocation of the carriages, the flexible connections for the supply conduits being indicated at 27.

Within the heating chambers I mount a plurality of cylinders 28, there being as many cylinders as there are sprue passages in each mold section and inasmuch as the sprue passages are arranged so that their seats 21 are in alignment, these cylinders can be arranged in alignment. Each cylinder is provided with a nozzle 29 preferably conical to seat in the seats 21 when the carriages are in discharging or molding position.

The cylinders project from the rear ends of the heating chambers and in the embodiment shown in Figs. 1 and 2, are provided with side openings 30 through which suitable pellets of molding material may be introduced or through which it may be injected if it is desired to introduce it in plastic condition. However, suitably shaped pellets may be introduced and are quickly rendered plastic by the heating of the heating chamber.

Plungers 31 coacting with the cylinders are mounted on a crosshead 32 of the hydraulic ram or plunger 33. These rams are reciprocatingly mounted in the pedestals 2. The ram cylinders 34 are suitably mounted on the table and provided with actuating fluid connections 35 and 36 connected to a suitable source of supply under pressure, the pump or pressure generating means not being illustrated.

37 indicates a manual control valve. I have not shown operating connections for this valve to the reversing mechanism as such details form no part of this invention and it is believed will be understood by those skilled in the art. It is desired to point out, however, that the automatic reversing valve units 38 are provided with actuating levers 39 and 40 with which tappets 41 on the crossheads coact. After charging, the valve 37 is manually actuated to deliver actuating fluid through the connections 36 to actuate the rams. The initial portion of the stroke of the rams advances the plungers 31 into the cylinders and serves to advance the carriages to mold engaging position, continued advancement of the plungers ejecting the plastic material into the mold. On the return stroke of the plungers, the carriages are retracted to the position shown in Figs. 1 and 2 by means of the crosshead engaging the heads 42 on the tappet rods 43.

The valve mechanisms 38 are so arranged that the valve levers 40 are actuated to reversing position when the plungers are in their fully advanced position and this automatically controls the retracting of the plungers and the carriages, the valve lever 39 being engaged when the parts are in their fully retracted position so that they remain in that position until the apparatus is again actuated by the manually controlled valve mechanism 37.

My improved molding apparatus is capable of mass production. A single operator can handle a large number of molds although in practice the capacity is increased by having two operators, one to carry away and return the molds to the machine operator with the work removed and the bodies placed in the mold for the covering operation so that all the machine operator has to do is to charge the machine and position the mold and operate the machine through the mechanism described.

In the embodiment shown in Fig. 8, I show a feeding mechanism for charging the mold. This comprises a feed chute 44 communicating with the opening 30 with a hopper 45 and rotary feed member 46 acting to charge the feed chute 40. The plunger 47 is provided with a suitable head 48 slidable within the cylinder 49, hydraulic or pressure fluid connections 50 and 51 being provided for the cylinder, the means for controlling these connections not being illustrated.

I have illustrated and described my improvements in an embodiment which I have found highly efficient both in the matter of capacity and in the quality of work. I have not attempted to illustrate or describe certain other adaptations or improvements which I contemplate as it is believed that this disclosure will enable those skilled in the art to which my invention relates to adapt or embody my invention as may be desired.

Having thus described my invention, what I claim as new and desire to secure by Letters Patent, is:

In a molding apparatus for applying shells to golf balls, a mold removably engageable with said mold support and comprising sections provided with sprue passages terminating at their outer ends in seats in the outwardly facing sides of the mold sections, carriages reciprocatingly mounted on opposite sides of said mold support for movement toward and from said mold, cylinders on said carriages having discharge nozzles seating in said seats of said sprue passages when the carriages are advanced to molding position, heating chambers on said carriages surrounding said cylinders, the cylinders being arranged with their rear ends projecting from said heating chambers and having charging openings for molding material in their projecting ends, hydraulic rams provided with crossheads, plungers mounted on said crossheads in coacting relation with said cylinders, said plungers acting first to advance the carriages to molding position and then to engage and discharge the molding material from the cylinders, and control means for said rams actuated by said crossheads.

JOHN M. OLDHAM.